United States Patent [19]

Gerber

[11] Patent Number: 4,836,072
[45] Date of Patent: Jun. 6, 1989

[54] VACUUM SUPPLY SYSTEM FOR MOVABLE CUTTER

[75] Inventor: Heinz J. Gerber, West Hartford, Conn.

[73] Assignee: Gerber Garment Technology, Inc., West Tolland, Conn.

[21] Appl. No.: 184,209

[22] Filed: Apr. 21, 1988

[51] Int. Cl.⁴ .................... B25B 11/00; B26D 7/01
[52] U.S. Cl. ........................... 83/152; 83/155; 83/451; 83/698; 83/925 CC; 269/21; 29/DIG. 84
[58] Field of Search ............ 83/24, 100, 451, 925 CC, 83/461, 155, 698, 152; 269/21; 29/DIG. 84; 144/252 A, 252 R; 409/137

[56] References Cited

U.S. PATENT DOCUMENTS

| | | | |
|---|---|---|---|
| 2,538,972 | 1/1951 | Magnani | 83/100 |
| 3,790,154 | 2/1974 | Gerber et al. | |
| 4,272,874 | 6/1981 | Krein | 269/21 |
| 4,322,993 | 4/1982 | Stumpf | 83/451 |
| 4,345,496 | 8/1982 | Pearl | |
| 4,476,756 | 10/1984 | Pearl et al. | |
| 4,528,878 | 7/1985 | Gerber | 83/451 |
| 4,542,672 | 9/1985 | Pearl | |
| 4,646,911 | 3/1987 | Pearl et al. | |
| 4,656,791 | 4/1987 | Herrington et al. | 269/21 |
| 4,715,805 | 12/1987 | Nasa | 83/925 CC |
| 4,768,763 | 9/1988 | Gerber | 269/21 |

FOREIGN PATENT DOCUMENTS

2908701  9/1980  Fed. Rep. of Germany.

Primary Examiner—Frank T. Yost
Assistant Examiner—Scott A. Smith
Attorney, Agent, or Firm—McCormick, Paulding & Huber

[57] ABSTRACT

A sheet material cutter is movable between a number of different cutting stations at which it cooperates respectively with a number of stationary spreading tables. Vacuum is transmitted from a single stationary vacuum generator to a number of normally closed junction boxes located one at each of the cutting stations. When the cutter is positioned at a selected cutting station, a vacuum inlet carried by the cutter aligns with the junction box serving that station, and the vacuum inlet is movable between connected and disconnected positions relative to the junction box to supply vacuum from the generator to the cutter.

11 Claims, 5 Drawing Sheets

VACUUM SUPPLY SYSTEM FOR MOVABLE CUTTER

BACKGROUND OF THE INVENTION

This invention relates to sheet material cutters, such as cloth cutters, having a table for supporting the material to be cut and wherein vacuum is applied to at least a portion of the support surface to compress the material as it is cut, and/or to aid in holding the material to the support surface, and deals more particularly with a system for supplying vacuum to such a cutting table in the case where the table is movable over a horizontal floor between a number of different cutting stations.

It is known, for example from U.S. Pat. No. 3,790,154, to provide the cutting table of a sheet material cutter with a vacuum which is applied to the material supporting surface at least in the vicinity of the cutting tool to compact and hold in place the material being cut, the vacuum generally working in cooperation with a sheet of thin plastic or similar air impermeable material spread over the material to be cut. It is also known, for example from U.S. Pat. Nos. 4,345,496, 4,646,911 and 4,476,756 to make the table of such a cutter in such a way that the support surface for the material to be cut is provided by an endless conveyor so that the material to be cut may be first spread on a separate spreading or lay-up table to form a lay-up consisting of a number of layers of material and may then be moved from the spreading table to the cutter through the conveying action of the cutting table's endless conveyor. It is also known, in a sheet material cutting plant, to provide a number of spreading tables serviced by a single cutter movable relative to the spreading tables to bring it into a position of cooperation with any selected one of the spreading tables. Thus, in the latter situation, while the cutter cooperates with one spreading table to receive and cut the layout made available at that table spreading may take place at one or more of the remaining tables to form one or more new lay-ups for later cutting by the cutter.

In known cutters of the type intended for movement between a number of spreading tables, the vacuum needed for application to the material support surface has been provided by a vacuum pump and drive motor carried by the frame of the cutter table so as to be part of the table and movable with it between its various cutting stations. Such movable cutting tables with built-in vacuum sources have a number of disadvantages including the fact that a relatively large amount of electrical power has to be supplied to the drive motor through some sort of connection permitting movement of the table, the fact that a relatively high degree of noise is produced in the vicinity of the cutting table by the running of the motor and the pump and the exhaust of air from the pump, and the fact that the flow of air through the vacuum system may have an adverse effect on the heating or air conditioning of the room containing the cutter, which effect is difficult to control because of the moving nature of the vacuum pump. Another disadvantage is that different cutting applications using the same general cutting table may require quite different amounts of vacuum power, yet it is difficult for the manufacturer of cutters with built-in vacuum sources to make such tables available with a wide selection of different built-in vacuum sources to precisely match the needs of different applications. In other words, it may be practical for the manufacturer to make available cutters with only one standard vacuum source, or with a very limited selection of standard vacuum sources, which may provide a much higher maximum vacuum power than needed for the application in question.

The general object of this invention is therefore to provide a system for supplying vacuum to a movable sheet material cutter which overcomes the above described disadvantages of movable cutters with built-in vacuum sources.

Other objects and advantages of the invention will be apparent from the following detailed description of a preferred embodiment.

SUMMARY OF THE INVENTION

The invention resides in the combination, in a sheet material cutting plant, of a cutter movable over the floor of the plant between a number of different cutting stations, a stationary vacuum generator, a plurality of vacuum junction boxes or outlets located one at each of the cutting stations, a duct arrangement connecting each junction box or outlet to the vacuum generator, and cooperable means on the various junction boxes or outlets and on the cutter for making a releasable connection between the junction box or outlet associated with the station at which the cutter is positioned and the cutter to allow the cutter to be provided with vacuum from the vacuum generator while positioned at any one of the cutting stations.

The invention also more particularly resides in the construction of the cooperable means on the individual junction boxes and on the vacuum inlet means of the cutter whereby a releasable connection may be made between the inlet means and any selected one of the junction boxes, such construction being such that during the making of a connection an airtight seal is first made between the inlet means and the junction box before a valve in the junction box is opened to admit vacuum to the inlet means, and so that during the breaking of a connection between the valve in the junction box is closed before the airtight seal between the junction box and the inlet means is released.

DESCRIPTION OF THE PREFERRED EMBODIMENT

Figure 1:
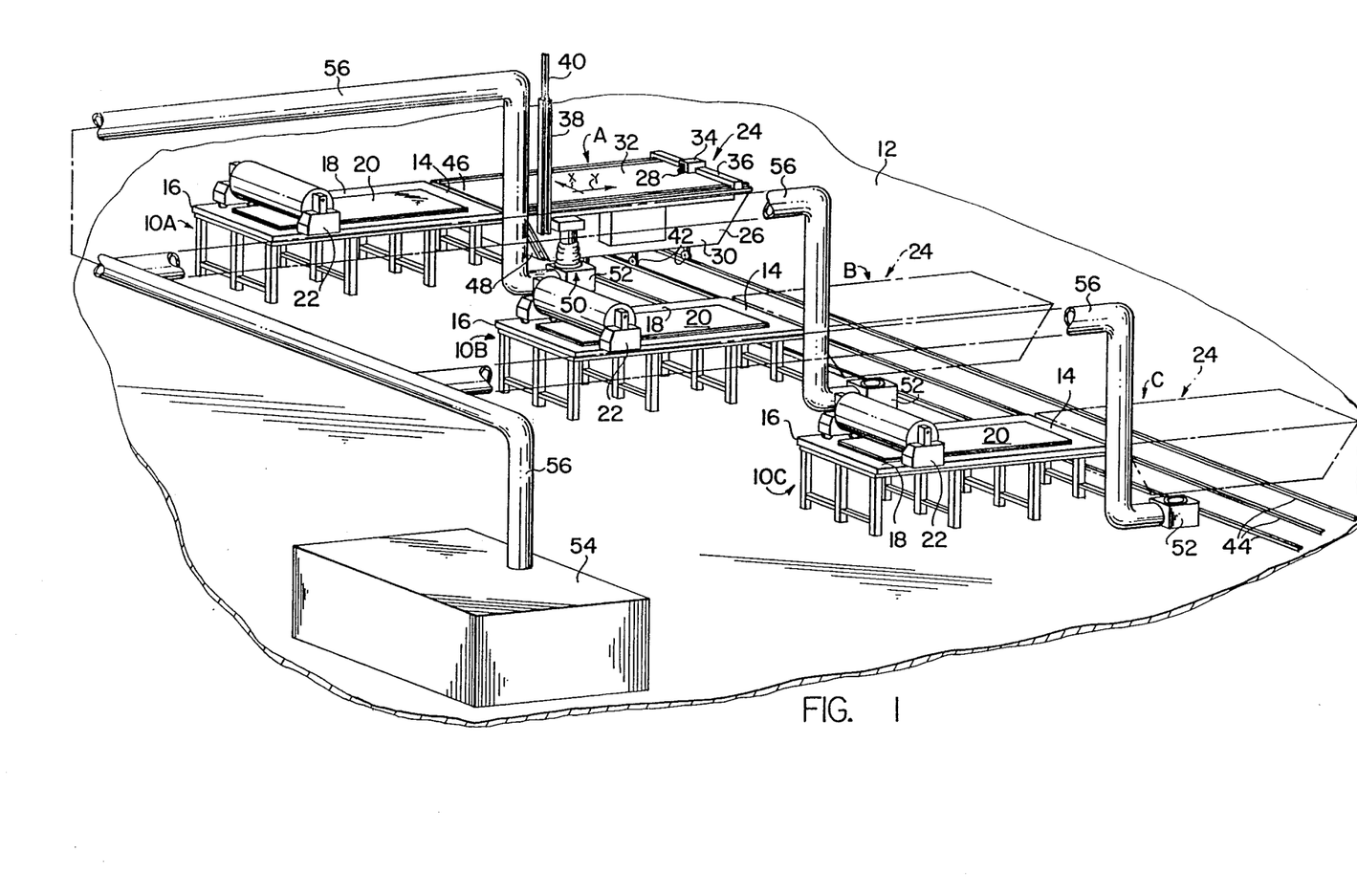
FIG. 1 is a somewhat schematic perspective view of a cutting plant using a movable cutter and vacuum supply system embodying the present invention.

FIG. 1 shows a portion of a cloth cutting plant embodying the present invention. As there shown, the plant includes three spreading tables 10A, 10B and 10C located at different fixed positions on the generally horizontal floor 12. Each of the three tables is elongated and has first and second ends 14 and 16, the tables being arranged so that all of their first ends 14, 14 are located along a common straight line. Each table further has an upwardly facing horizontal support surface 18 on which a lay-up 20 of a cloth may be spread using a conventional spreading machine 22 movable back and forth longitudinally of the table.

Associated with the three spreading tables 10A, 10B and 10C is a cutter indicated generally at 24. The cutter includes a table 26 and a cutter head 28. The table 26 has a frame 30 and a means providing a generally horizontal upwardly facing material support surface 32. The cutter head 28 has a cutting element, such as a reciprocating knife, for cutting sheet material supported on the surface 32 and is movable in two coordinate directions in the plane of the surface 32 so as to be capable of following any desired path to cut, for example, pattern pieces from sheet material for subsequent use in making garments, upholstery assemblies or the like. To achieve this motion, the cutter head 28 is supported by a tool carriage 34 movable in the illustrated Y-coordinate direction relative to another carriage 36 extending across the table and supported by the frame 30 for movement in the illustrated X-coordinate direction. Suitable motors, drive systems and controllers are provided to achieve the desired motions of the cutting head. Power and command signals for these motors, as well as for other motors which may be included in the cutter 24, are supplied to the cutter through a vertically extending mast 38 fixed to one corner of the table frame 30 and receiving flexible cables from an overhead rail system from which excess cabling is hung in festooned fashion from trolleys to accommodate movement of the cutter 24 in the manner hereinafter described.

A feature of the cutter 24 is that it is supported for movement relative to the floor 12 between a number of different work stations at each of which stations it is aligned with a different one of the spreading tables 10A, 10B and 10C to receive and cut sheet material spread on that spreading table. For example, in FIG. 1 the solid lines show the cutter 24 positioned at the cutting station A at which it is aligned with the spreading table 10A. The broken lines illustrate two other cutting stations B and C to which the cutter 24 may be moved to align respectively with the cutting tables 10B and 10C. Various different means may be used for supporting the cutter for movement between its different cutting stations, and in FIG. 1 such means are shown to consist of a number of wheels 42, 42 carried by the table frame 30 and supporting the frame 30 for movement along three rails 44, 44 fixed to the floor 12 and extending perpendicularly to the spreading tables 10. Preferably, the cutter includes a motor for powering one or more of the wheels 42 to drive the table between its cutting stations and a suitable control panel (not shown is provided to allow an operator to effect and control movement of the cutter between the cutting stations.

As shown in FIG. 1, the table 26 of the cutter 24 has a first end 46 positioned closely adjacent to the end 14 of the associated spreading table 10 when the cutter is positioned at one of its cutting stations. Therefore, when the cutter is positioned at a cutting station, the lay-up 20 previously spread on the associated cutting table may be moved from that table to the support surface 32 of the cutter for cutting by the cutter head 28. Depending on the length of the lay-up 20 relative to the length of the cutting table 26, either the entire length of the lay-up may be moved at one time onto the cutting table before any cutting occurs or the lay-up may be moved onto the cutting table in increments with each increment being cut before a new increment is moved into cutting position. The actual movement of the lay-up from the spreading table to the cutting table may take place in various different ways, but preferably and as shown the support surface 32 is formed by an endless conveyor 48 movable in the illustrated X-coordinate direction; and which is moved in such direction or from left to right in FIG. 1 to aid in pulling the lay-up from the spreading table to the cutting table. For example, the cutting table may be generally similar to those shown by U.S. Pat. Nos. 4,345,496, 4,646,911 and 4,476,756 to which reference may be made for further details of construction. As shown by these patents, the conveyor belt 48 preferably is comprised of a plurality of bristle blocks having bristles the free ends of which form the material supporting surface 32 which is penetrable by the knife of the cutter head 28.

In the operation of the system as shown in FIG. 1, it will be understood that a lay-up 20 is first spread on one of the spreading tables 10 until it is complete and ready for cutting. The cutter 24 is then moved to the cutting station at which it aligns with this table, the lay-up is pulled onto the support surface 32 of the cutting table, either all at one time or incrementally, and the lay-up is then cut by the cutter head 28 to produce the desired pattern pieces. During this cutting, spreading may occur on one or both of the other spreading tables so as to have a new lay-up ready for cutting as soon as the cutter 24 again becomes available. During or after the cutting of a lay-up the pattern pieces and waste material produced by the cutting are removed from the cutter before the cutter is moved to a new cutting station or while the cutter is in transit to the new cutting station. This may be done either by picking the pattern pieces and waste material up from the material supporting surface 32 of the cutter table or, after cutting, the conveyor belt 48 may be operated to move the cut material to the right, as seen in FIG. 1, onto a conveyor or other take-off device (not shown) aligned with the right hand end of the cutting table 26.

Although as described above the system of FIG. 1 is used for the spreading and cutting of lay-ups, it may also be used in cases where only a single layer is spread onto a spreading table before it is moved onto the cutter for cutting. Also, the system can be used for so called "cutting on the fold" in which case a single length of cloth is spread on a spreading table but is folded upon itself along a fold line extending longitudinally of the table to form a double layered unit presented to the cutter for cutting.

In accordance with the invention, the cutter 24 is one in which, during a cutting operation, vacuum is applied to the material support surface 32 at least in the vicinity of the cutting head 28 to compact the material and to aid in holding it in place on the material support surface 32 against in-plane forces exerted on it by the cutting knife. To gain full effect of this vacuum, the lay-up to be cut is, before cutting, preferably covered with a sheet of plastic or other substantially air impervious sheet material so that due to the vacuum appearing at the support surface and the atmospheric pressure applied to the top of the plastic sheet the material is compressed between the plastic sheet and the support surface in accordance with the principle of, and as explained in more detail by, U.S. Pat. No. 3,790,154.

To provide for the vacuum applied to the material support surface 32, the frame 30 of the cutting table carries a vacuum inlet means indicated generally at 50, and the table also includes transmission means for transmitting vacuum appearing at the inlet means 50 to the desired portion of the material support surface 32. This transmission means may take various different forms without departing from the invention and may, for example, be similar to that shown by either U.S. Pat. Nos. 4,345,496, 4,646,911 or 4,476,756 with the vacuum inlet means 50 taking the place of the vacuum pump shown in each of said patents.

The vacuum inlet means 50 of the cutter 24 is cooperable with a number of vacuum junction boxes or outlets 52 located one at each of the three cutting stations A, B and C. The junction boxes 52 are further so located at each cutting station that when the cutter 24 is properly positioned at a cutting station, the inlet means 50 registers or aligns with the junction box 52 of tat station. Further, the inlet means 50 and each junction box 52 include cooperable means allowing the inlet means 50 to make a releasable connection with any of the junction boxes 52 with which it may become aligned.

The junction boxes 52 are each connected with a vacuum generator 54 by ducts 56, 56 so that the vacuum produced by the generator 54 is made available at each junction box. When a connection is made between the inlet means 50 and one junction box 52, as shown for example at station A in FIG. 1, the vacuum appearing inside the involved junction box is, as hereinafter described in more detail, admitted to the interior of the inlet means for transmission to the material support surface 32.

The vacuum generator 54 may be of generally conventional construction and consists basically of a motor driving a vacuum pump. Because of the connection of the vacuum generator 54 to the junction boxes 52, 52 by the ducts 56, 56 the generator may be located, if desired, quite remote from the spreading tables 10, 10 and cutter 24, and may even be placed in a separate room to remove its noise from the spreading table and cutter operators. Also, since the generator is not carried by the cutter 24, the cutter 24 may be made of smaller size and lighter in weight than heretofore. The stationary disposition of the vacuum generator 54 separate from the cutter 24 also has the advantage that it can readily be sized and otherwise designed to particularly suit the application to which the associated cutter 24 is put. Also, with this disposition of the generator 54 heat exchangers and other devices can, if desired, be readily associated with it to integrate it into the heating and/or air conditioning system of the cutting plant to diminish any adverse effect the generator might otherwise have on such heating and/or air conditioning system.

In FIG. 1, the arrangement of the ducts 56, 56 is such that a large portion of them is located high above the floor 12 so as to be out of the way of operators and equipment needed in the vicinity of the spreading tables and cutter during spreading and cutting operations. The illustrated arrangement of ducts, however, is not essential, and many other arrangements may be used without departing from the invention. For example, with junction boxes located on or in the floor 12, the ducts 56 connecting those boxes to the generator 54 may be located below the floor surface. Also, the junction boxes themselves need not necessarily be located on or in the floor, and can be located above the cutting table 24 with the inlet means 50 of the cutter being directed upwardly for cooperation with such upwardly located junction boxes rather than being downwardly directed as in FIG. 1.

Figure 2:
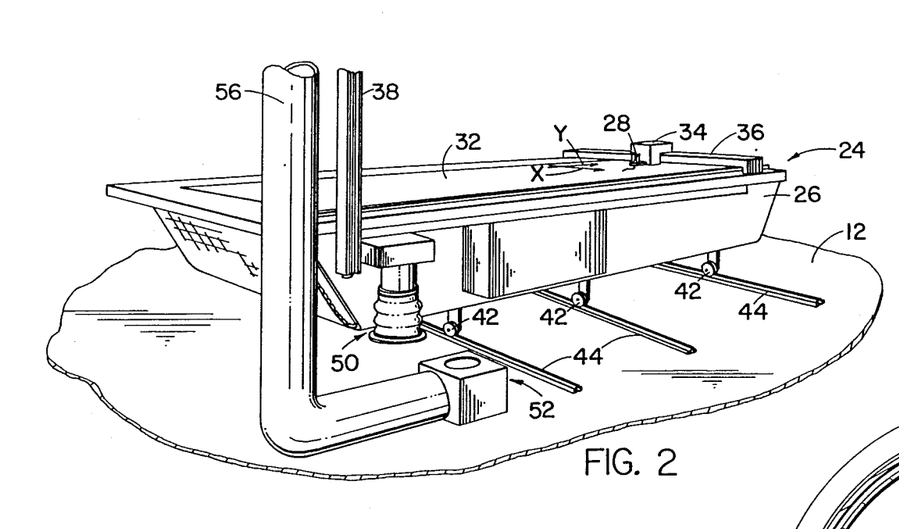
FIG. 2 is a perspective view showing the cutter of FIG. 1 slightly displaced from one of its cutting stations and therefore showing the vacuum inlet means of the cutter slightly displaced from and out of connection with the vacuum junction box of the station in question.
Figure 3:
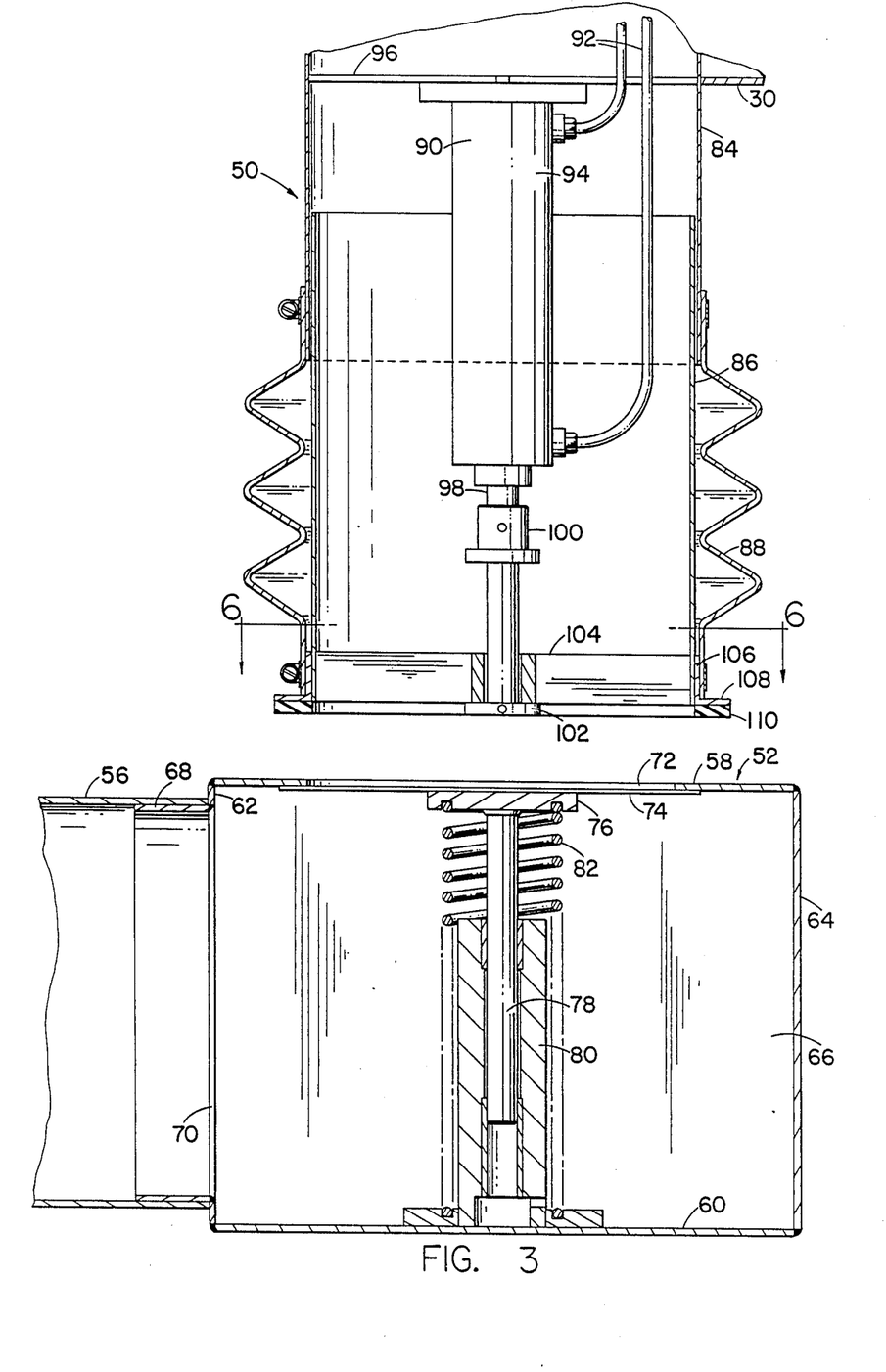
FIG. 3 is a vertical sectional view taken through the vacuum inlet means of the cutter of FIGS. 1 and 2 and through an associated one of the vacuum junction boxes when the cutter is positioned at one of its cutting stations, the inlet means of the table being shown in its disconnected condition with respect to the illustrated junction box.
Figure 4:
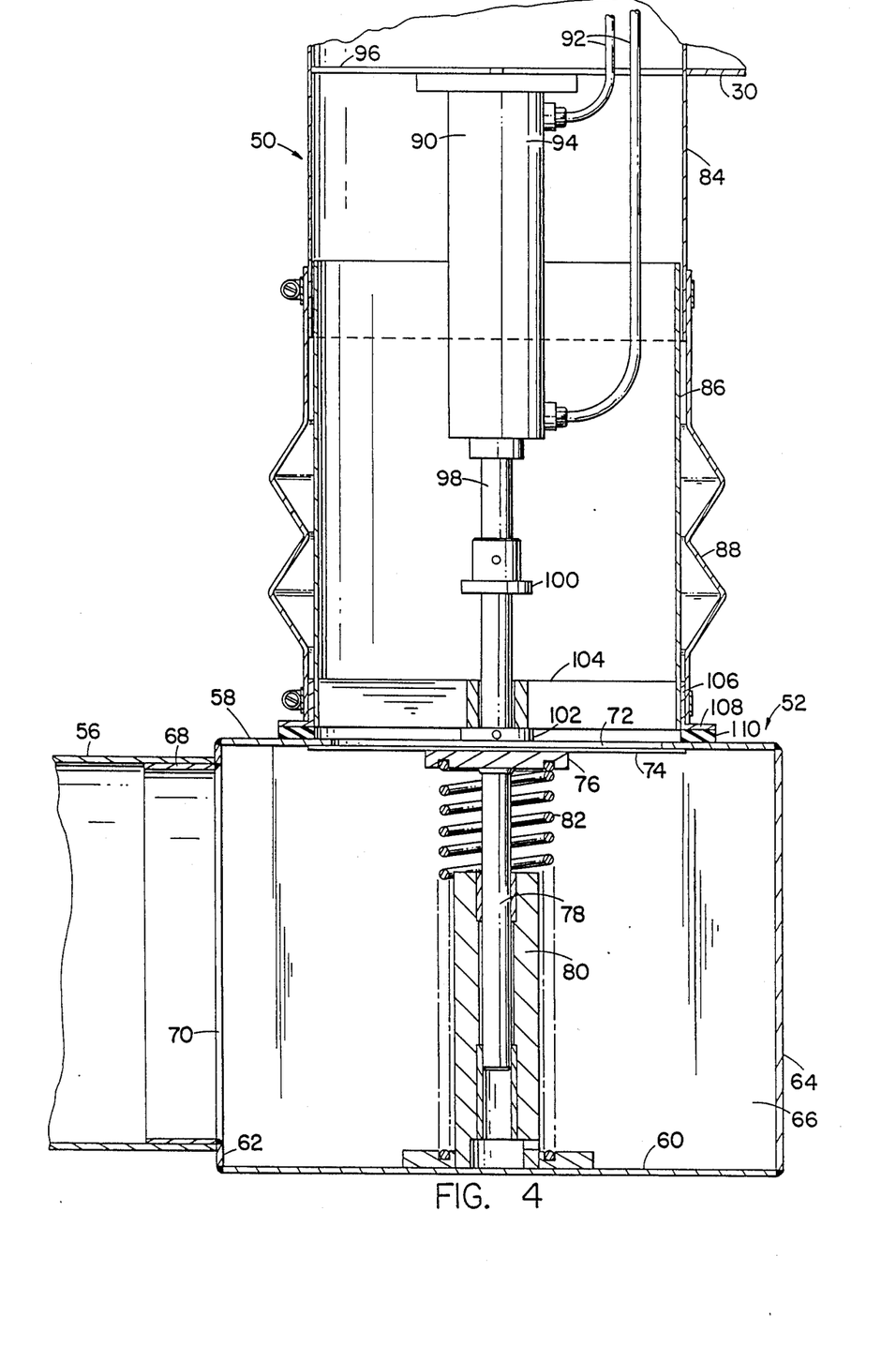
FIG. 4 is a view similar to FIG. 3 but with the inlet means of the cutter being shown in a condition intermediate its connected and disconnected conditions relative to the illustrated junction box.
Figure 5:
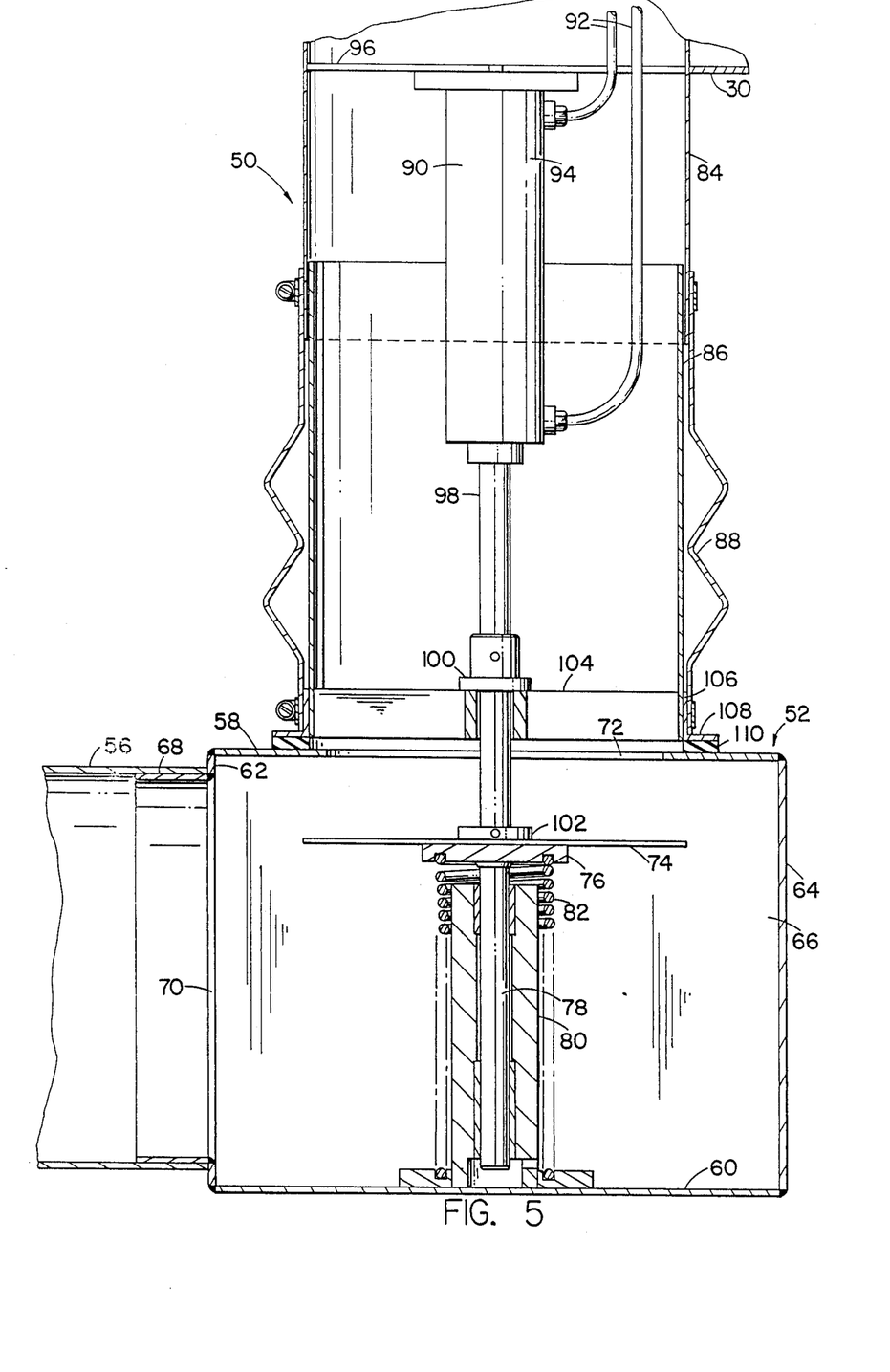
FIG. 5 is a view similar to FIG. 3 but with the inlet means of the cutter being shown in its connected condition relative to the illustrated junction box.
Figure 6:
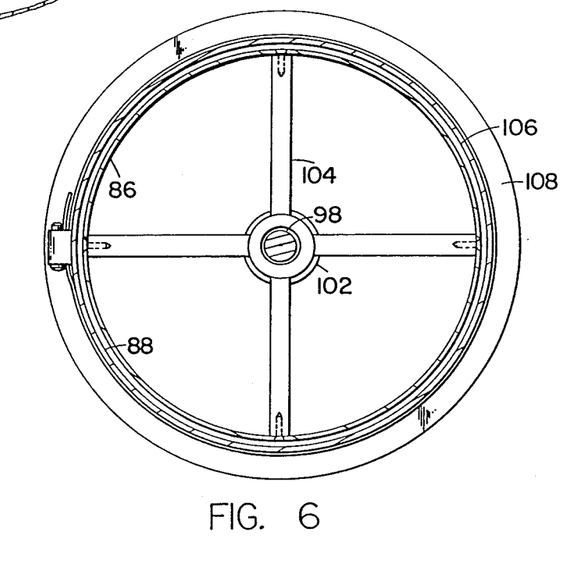
FIG. 6 is a horizontal sectional view taken on the line 6—6 of FIG. 3.

Reference is now made to FIGS. 2 to 6 for a discussion of the details of the junction boxes 52, 52 and of the inlet means 50 of the table 24. In FIG. 2, the table 24 is shown slightly displaced from the cutting station served by the illustrated junction box 52. Therefore, the inlet means 50 of the cutter is both disconnected from and slightly laterally displaced from the illustrated junction box. In FIGS. 3, 4 and 5, the cutter is fully positioned at the cutting station associated with the illustrated junction box, the inlet means 50 therefore being vertically aligned or registered with such junction box. FIG. 3 shows the inlet means in it disconnected position relative to the junction box, whereas FIG. 5 shows it in its connected position. FIG. 4 shows the inlet means in an intermediate position at which it is sealingly associated with the junction box but the valve of the junction box is closed so that vacuum appearing in junction box is not admitted to the inlet means.

As shown in FIGS. 3, 4 and 5, each junction box 52 is a hollow generally rectangular box having horizontal top and bottom walls 58 and 60, vertical end walls 62 and 64 and two vertical side walls only one of which is shown at 66. The associated vacuum supply duct 56 is attached to the box by a collar 68 surrounding and defining an inlet opening 70 for the box in the end wall 62. The top wall 58 of the box has a generally circular access port 72 normally closed by a disk shaped valve member 74 as in FIGS. 3 and 4. The valve member 74 is fixed to a hub 76 fixed to a rod 78 slidably received for vertical movement by a bearing 80 fixed to and carried by the bottom wall 70. A helical compression spring 82 surrounds the bearing 80 and, rod 78 and urges the valve member 74 to its closed position. The spring 82 is further sized so that the valve member 74 will remain in its closed position against the force exerted on it by the expected maximum pressure difference which may occur across it due to the vacuum inside of the box acting on the lower surface of the valve member and atmospheric pressure acting on the upper surface of the valve member.

The inlet means 50 as shown by FIGS. 3, 4 and 5 includes a first generally cylindrical duct 84 fixed relative to the frame 30 of the cutter table and which through a suitable vacuum transmission means included in the table is communicable with a desired portion of the material support surface 32. Another duct 86 is telescopically received by the first duct 84 for vertical sliding movement relative thereto. An airtight flexible tubular boot 88 has one end sealingly connected to the first duct 84 and its other end sealingly connected to the second duct 86 in the manner shown to prevent the loss of vacuum through the telescopic joint.

The second duct 86 is moved vertically relative to the first duct 84 both by gravity and by an actuator 90 located within the two ducts 84 and 86. The actual actuator used may take various different forms, but in the illustrated case it is a pneumatic piston unit served by lines 92 for the supply and exhaust of pressurized air. The body 94 of the actuator at its upper end is fixed to and carried by a part 96 located within the duct 84 and fixed relative to the frame 30 of the cutter table. A piston rod 98 extends out of the lower end of the body and has fixed it to it two vertically spaced stop collars 100 and 102. Slidably received on the rod 98 between the two stop collars is a spider 104, best shown in FIG. 6, fixed to the lower end of the duct 86.

Also fixed to the lower end of the duct 86 is an annular ring 106 having an annular radially extending flange 108 carrying an annular sealing ring 100 of rubber or other resilient material.

When the piston rod 98 is in its retracted position, as shown in FIG. 3, the stop 102 engages the spider 104 and holds it and the duct 86 in upwardly spaced relation to the top wall 58 of the junction box 52. Therefore, in this retracted condition of the piston rod 98 the inlet means 50 is in its disconnected condition relative to the junction box, and the valve 74 of the junction box is closed, allowing the inlet means to be moved horizontally to or from the junction box and thereby allowing movement of the cutter between cutting stations. To shift the inlet means 50 from a condition of disconnection with the junction box to a condition of connection, the piston rod 98 is extended. During the initial portion of this extending movement, as the stop 102 moves downwardly, the sliding duct 86 moves downwardly with the stop 102 under the influence of gravity until the duct reaches the position shown in FIG. 4 at which the sealing ring 110 sealingly engages the top wall 58 of the box in the area surrounding the access port 72. It will be noted from FIG. 4 that at the point in the extending movement of the piston 98 at which this seal is made, the valve member 74 of the junction box 58 is still in its closed condition so that when the valve member 74 is later opened no leakage of vacuum occurs.

Further extending movement of the piston rod 98, beyond the position shown in FIG. 4, thereafter causes the stop 102 to engage the top of the valve member 94 and shift it downwardly. At this time, further downward movement of the duct 86 is arrested by its engagement with the junction box so that the piston rod 98 slides relative to the spider 104 until reaching the fully extended position of the piston rod 98, shown in FIG. 5, at which the stop 100 engages the spider 104. Preferably, the location of the stop 100 on the piston rod 98 is so selected that when the piston rod is in its fully extended position the stop 100 urges the spider 104 slightly downwardly from its FIG. 4 position to further compress the sealing ring 110 and form a still tighter seal between the duct 86 and junction box 52. The downward movement of the valve member by the piston rod from the FIG. 4 to the FIG. 5 position, against the force of the spring 82, shifts the valve member 74 to its fully open position as illustrated in FIG. 5, and thereby admitting vacuum from the box 52 to the interior of the ducts 86 and 84 through the access port 72.

The operation of the parts of the junction box 52 and of the inlet means 50 in shifting the inlet means from the connected condition of FIG. 5 to the disconnected condition of FIG. 3 follows in reverse fashion to that described above for the process of making a connection. In particular, it will be noted that in shifting from the connected condition of FIG. 5 to the disconnected condition of FIG. 3, which is achieved by a retracting motion of the piston rod 98, the parts will move through the condition shown in FIG. 4, which means that the valve member 74 is closed before the sealing connection between the duct 86 and junction box 52 is broken.

It will also be appreciated that, if desired, a spring may be included in the inlet means and arranged to work between the first duct 84 and second duct 86 to assist gravity in urging the duct 86 downwardly for cooperation with a junction box located below the inlet means. In the case where the ducts of the inlet means are directed upwardly for cooperation with a junction box located above the cutter, such a spring means is necessary and must be of sufficient strength to urge the slidable duct upwardly to engagement with a junction box against the force of gravity.

I claim:

1. In a sheet material cutting plant, the combination comprising:
   a generally horizontal floor having a number of different cutting stations,
   a plurality of vacuum outlets each located at a respective one of said cutting stations,
   a vacuum generator,
   duct means connecting all of said vacuum outlets to said vacuum generator so that vacuum produced by said generator is available at each of said outlets,
   a sheet material cutter including a cutting table,
   means supporting said cutting table for movement over said floor to any selected one of said cutting stations, and
   means for releasably connecting said cutting table to the vacuum outlet associated with the cutting station at which said table is positioned to supply vacuum from said generator to said table through such outlet.

2. In a sheet material cutting plant, the combination comprising:
   a generally horizontal floor,
   a sheet material cutter including a cutting table having a frame, a support surface for supporting sheet material to be cut in a spread condition, and a vacuum inlet means carried by said frame for receiving vacuum which is applied to at least a portion of said support surface, and a cutter head movable relative to said support surface to cut parts from sheet material supported thereon,
   means supporting said cutting table for horizontal movement relative to said floor between a plurality of cutting stations fixed relative to said floor,
   a vacuum supply system including a vacuum source, a plurality of vacuum junction boxes fixed relative to said floor and located one at each of said cutting stations, and duct means connecting the interior of each of said junction boxes to said vacuum source, each of said vacuum boxes having an access port and a valve member associated with said access port, said valve member having a normally closed position and being movable to an open position, said junction boxes being arranged so that when said cutting table is positioned at any selected one of said cutting stations said vacuum inlet means of said cutting table is aligned with the junction box serving the selected cutting station, and
   cooperable means on said junction boxes and on said inlet means providing a releasable connection between said inlet means and any one of said junction boxes with which said inlet means may be aligned, said releasable connection having a released condition at which the valve member of the involved one of said junction boxes is in its normally closed position and said inlet means is mechanically disconnected from said involved junction box so as to be free to move horizontally relative thereto and a connected condition at which said inlet means is sealingly connected to said junction box and the valve member of the involved junction box is held in its open position to transmit vacuum from said junction box to said inlet means.

3. The combination defined in claim 2 further characterized by said cutting table being elongated and having first and second longitudinal ends, and a plurality of spreading tables located one adjacent each of said cutting stations, said spreading tables being arranged so that when said cutting table is located at any selected one of said cutting stations its first longitudinal end is aligned with the spreading table associated with that cutting station.

4. The combination defined in claim 3 further characterized by said cutting table being a conveyor table wherein said support surface is provided by an endless belt of supporting material movable relative to the remainder of the table in the direction longitudinally of the table.

5. The combination defined in claim 2 further characterized by each of said junction boxes having a generally horizontal wall with the access port of said junction box being defined by a hole passing through said horizontal wall, said valve member of each junction box being located inside of said box and being supported for movement toward and away from said hole in said horizontal wall, said valve member having a closed position at which it engages the inside surface of said horizontal wall along the periphery of said hole and also having an open position at which it is spaced from said hole, a spring inside each of said junction boxes urging the associated valve member toward its closed position, and said cooperable means including a member forming part of said inlet means and movable vertically relative to said table frame between a first position at which it is vertically spaced from the valve member of any of said junction boxes which may be aligned with said inlet means and a second position at which it engages the valve member of any junction box aligned with said inlet means and holds such valve member in its open position.

6. The combination defined in claim 5 further characterized by said inlet means including a vertically extending first duct fixed relative to said frame, a second duct supported by said first duct for telescopic movement relative thereto, said second duct having a free end, and an actuator for moving said second duct vertically relative to said first duct between a first position at which it is spaced from any one of said junction boxes which may be aligned with said inlet means and a second position at which its free end sealingly engages a junction box aligned with said inlet means and surrounds the access port defining hole of said junction box.

7. The combination defined in claim 6 further characterized by said free end of said second duct having a radially extending annular flange carrying an annular sealing ring which engages the outer surface of said horizontal wall along the periphery of said hole when said second duct is in said second position.

8. The combination defined in claim 6 further characterized by a flexible sealing boot surrounding portions of said first and second ducts and having two ends, said sealing boot being sealingly connected at one end to said first duct and being sealingly connected at its other end to said second duct to provide an airtight seal between said first and second ducts.

9. The combination defined in claim 5 further characterized by said inlet means comprising a vertically extending first duct carried by and fixed to said able frame, a second duct supported by said first duct for telescopic movement relative thereto, said second duct having a free end movable by virtue of vertical telescopic movement of said second duct relative to said first duct between a first position at which it is out of sealing engagement with any one of said junction boxes which may be aligned with said inlet means and a second condition at which it is in sealing engagement with any one of said junction boxes which may be aligned with said inlet means, said means for engaging the valve member of the associated junction box to move it to and hold it in an open condition including an actuating rod supported within said first and second ducts for vertical movement relative to both of said ducts, and an actuating means including a common single actuator for vertically moving said second duct into and out of sealing engagement with a junction box which may aligned therewith and said actuating rod vertically into and out of engagement with the valve member of such junction box, said actuating means being so constructed that in the process of said second duct being shifted from its said first position to its said second position, said second duct is brought into sealing engagement with said junction box before said actuating rod opens said valve member of the junction box and so that in the process of shifting said second duct from said second position to said first position said actuating rod is moved out of engagement with the valve member to allow the valve member to move to its closed position before said second duct is moved out of sealing engagement with the junction box.

10. The combination defined in claim 9 further characterized by said actuator being a fluid type piston actuator located within said first and second ducts.

11. The combination defined in claim 10 further characterized by said actuator having a body fixed relative to said first duct and also having a vertically movable piston rod which serves as said actuating rod, and a part fixed to said second duct and slidably received on said piston rod between two fixed stops on said piston rod, one of said fixed stops during movement of said piston rod toward a junction box which may be aligned with said inlet means engaging said part to urge said second duct tightly into sealing engagement with said junction box, and the other of said stops during movement of said piston rod away from such junction box engaging said part to drive said second duct away from engagement with such junction box after said piston rod has moved out of engagement with the valve member of said box.

* * * * *